Figure 1:
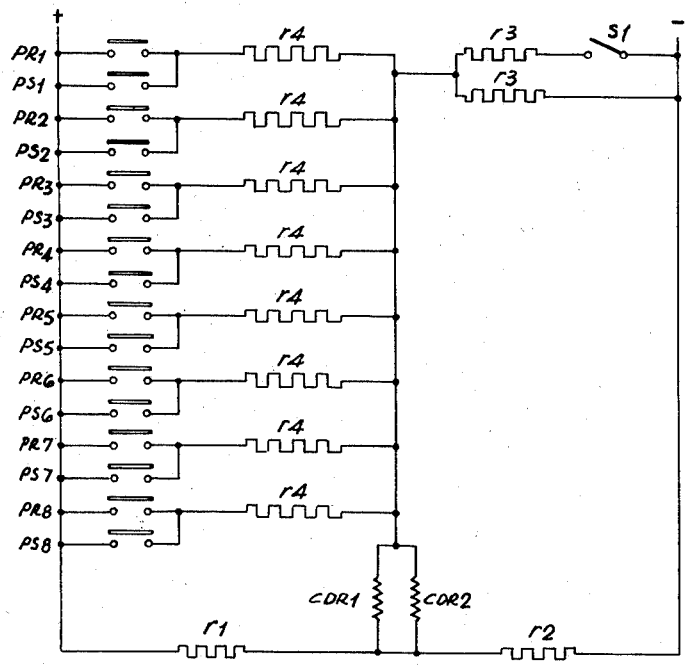

May 16, 1961  A. E. T. NYE  2,984,610

PROTECTIVE EQUIPMENT

Filed Oct. 21, 1957

INVENTOR
ANTHONY EDWARD THOMAS NYE

ATTORNEY

United States Patent Office 2,984,610
Patented May 16, 1961

2,984,610
PROTECTIVE EQUIPMENT

Anthony Edward Thomas Nye, Clifton, near Rugby, England, assignor to The British Thomson-Houston Company Limited, London, England, a British company Filed Oct. 21, 1957, Ser. No. 691,482
Claims priority, application Great Britain Oct. 26, 1956
4 Claims. (Cl. 204—193.2)

This invention relates to protective equipment for nuclear reactors of the kind in which there are a number of coolant passages each provided with an independent circulator. The equipment protects the reactor in the event of failure or partial failure of circulation of gas coolant.

If, by way of example, we consider a reactor having eight cooling channels each with its own compressor, analysis has shown that the failure of one circulator can be accommodated, but if two or more fail it is necessary to shut down the reactor.

Sometimes it is necessary to remove a circulator from service for the purpose of repair, and it will be realised that in this circumstance, the failure of two further circulators out of the seven now in operation in the example considered, would cause a greater percentage decrease in the effectiveness of the system, so that under such circumstances it would then be safer to shut down on the failure of only one circulator.

If the reactor is operating continuously at half power, only four circulators would normally be in operation, and again in this circumstance it would be obvious that the failure of one would be equivalent to the failure of two in normal operation, that is to say it would be 25% of the total, and therefore, the reactor must be shut down on the failure of only one circulator.

The main object of the present invention is to provide a system in which the conditions determining automatic shut down of the reactor can be readily pre-selected to suit varying circumstances.

According to the present invention protective equipment for a gas cooled reactor of the kind referred to comprises a normally unbalanced electrical bridge circuit, means for varying the resistance of a first arm of the bridge each time failure of a circulator occurs in a manner to tend to bring the bridge into balance, means for adjusting the resistance of a second arm to select the value of the resistance of the first arm required to effect a balance of the bridge, the arrangement being such that under normal conditions out of balance current in the bridge circuit flows through the actuating coils of relays so as to hold in the armatures of said relays, whilst when the out of balance current has been reduced to an extent corresponding to failure of a preselected number of circulators the armatures of said relays are released to effect a shut down of the reactor.

In carrying out the invention the resistance in the first arm of the bridge is arranged to be a function of the number of circulators not operating, and it is varied by contacts associated with each individual circulator, which contacts are normally open, and which close respectively both when the mass flow in the corresponding circulator is reduced by a predetermined amount, and also when the direction of flow of the gas in the duct reverses.

In order that the invention may be more clearly understood reference will now be made to the accompanying drawing, in which:

Fig. 1 shows the arrangement of the electrical bridge circuit, and

Figure 2:
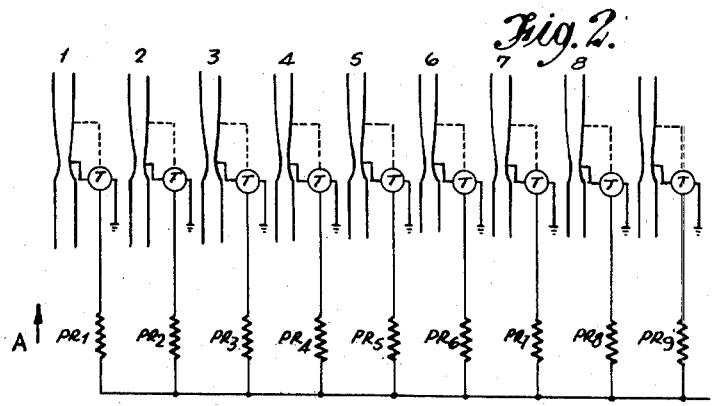

Fig. 2 indicates diagrammatically the arrangement of the devices sensitive to mass flow.

The bridge circuit, supplied from an external D.C. source, is shown in Fig. 1. Arm 1 comprises a number of resistors $r4$, one corresponding to each circulator, eight in this example, one end of each resistance being connected to a common line and the other ends being connected through separate relay contacts to the positive line. Any of these resistances can be connected to the positive line by the closing of either of the respective relay contacts, the relay coil of one of which is responsive to coolant mass flow and the relay coil of the other of which is responsive to direction of coolant flow.

Arm 2 comprises two equal resistances $r3$ connected together at one end. A switch S1 is connected between the other end of one of the resistances and the negative line while the other end of the other resistance is connected directly to the negative line. Operation of switch S1 allows the resistance of the arm to be varied.

Arms 3 and 4 comprise equal resistances $r1$ and $r2$. The coils of two polarised relays CDR1 and CDR2 are connected in parallel across the bridge as shown.

It will be evident that when the switch S1 is closed, and all the contacts of relays PR1 to PR8 and PS1 to PS8 are open, the bridge will be unbalanced, and the relays CDR1 and CDR2 will be energised by a current flowing in the coils thereof. In these conditions the reactor operates normally. If one circulator fails, the contacts of the appropriate relay closes, and connects its associated resistance into the first arm of the bridge. The bridge remains unbalanced, however, so that no further action occurs. If simultaneously or subsequently, a second circulator were to fail, a second resistance would be connected in parallel with the first, and the bridge would be balanced. Thus, CDR1 and CDR2 would be de-energized, and would effect automatic shut down of the reactor in some well known manner. The relays will include armatures which will be retained when the relays are energized, but will be released when the out-of-balance current flowing through the coils falls below a certain value. The armatures of the relays can be adapted to actuate apparatus for shutting down the reactor.

It will be evident that if S1 is left open, balance of the bridge would be achieved when only one of the contacts closed, and in this event the reactor would be shut down on the failure of one circulator.

It will be seen that these actions occur whether the contacts conscious of flow, or those conscious of direction of flow operate.

Fig. 2 shows the circuit for the relay coils corresponding to the contacts conscious of pressure difference, or mass flow. Differential pressure signals are obtained from venturis in the gas ducts, and are fed to pneumatic electrical transducers T, the output of which, in the form of a D.C. voltage to earth, is applied to one side of the polarised relays PR1 to PR8, the other side of the relays being connected to a common line which is not earthed, and is therefore floating. When all the pressure difference signals are equal there will be no circulating current, and the relays will be de-energised. Reduction in the pressure difference in any one gas circulator, however, produces a reduction in the voltage with respect to earth applied to the respective one of the polarised relays, and due to the now unbalanced state of the system, circulating current flows in the circuit to energise the appropriate relay, and close the contacts in Fig. 1. It should be noted that the contactor coils are polarised so that they operate only when a current is flowing in the direction of the arrow A, and it will be appreciated that the circulating current will flow in this direction only through the relay associated with the circulator that has failed.

Failure of two circulators obviously causes two relays to operate and close the respective contacts in Fig. 1. The circulating current will be sufficient to operate four relays simultaneously in the event of four simultaneous failures, and when two sets of four gas circulators are each connected to a different source of supply, it is considered virtually impossible for more than four to fail simultaneously, unless all the eight circulators fail due to a double supply fault, but in this circumstance separate means provide for the necessary action.

It will be observed that polarised relays PR1 to PR8 are normally de-energised, and thus do not fail to safety, and it is because of this that pressure switches PS1 to PS8 are included. These may be connected across an orifice plate in the ducts, or preferably across the heat exchanger, and they operate in the event of a reversal of direction of gas flow.

Following gas failure, flow reversal does not take place until after the stall point, and the delay encountered may be a few seconds. For deliberate operation with less than eight blowers, reverse gas flow is prevented by means of valves in the ducts not in use.

Important advantages of the invention are that a bridge circuit is used and therefore a stabilised D.C. supply is not necessary, and furthermore the polarised relays CDR1 and CDR2 are not required to be current sensitive relays, but are required to discriminate only between a current in one direction and any other state, such as zero current or current in the opposite direction.

In addition, operation of the circuit with a number of blowers in operation other than the maximum is achieved by isolating the polarised relays PR1 to 8 from the corresponding transducers for the ducts not in use.

Whilst in the drawing there are two resistors r3 in parallel, with one switch S1, clearly further switched resistances may be employed enabling further changes in sensitivity of the control to be made.

What I claim is:

1. In a nuclear reactor having a plurality of coolant passages each provided with an independent circulator, protective equipment comprising in combination a normally unbalanced bridge circuit provided with four arms, a relay having an actuating coil, an armature controlled by said relay and adapted to control apparatus for shutting down the reactor, means for pasing out-of-balance current of said bridge circuit through said actuating coil of said relay so as normally to retain said armature and so as to release said armature to effect the shut down of the reactor when said out-of-balance current has been reduced to a predetermined value, means actuated by the failure of each circulator for varying the resistance of a first arm of said bridge circuit in a manner tending to reduce the out-of-balance current, and means for adjusting the resistance of a second arm of said bridge circuit in order to vary the number of circulators the failure of which will reduce the out-of-balance current to said predetermined value.

2. In a nuclear reactor having a plurality of coolant passages each provided with an independent circulator, protective equipment comprising in combination a normally unbalanced bridge circuit provided with four arms, a relay having an actuating coil, an armature controlled by said relay and adapted to control apparatus for shutting down the reactor, means for passing out-of-balance current of said bridge circuit through said actuating coil of said relay so as normally to retain said armature and so as to release said armature to effect the shut down of the reactor when said out-of-balance current has been reduced to a predetermined value, a plurality of resistances connected together at one end in parallel and associated in one-to-one correspondence with said circulators, means actuated by the failure of each circulator for introducing the associated resistance into a first arm of said bridge circuit in such a manner as to reduce the out-of-balance current, and means for adjusting the resistance of a second arm of said bridge circuit in order to vary the number of circulators the failure of which will reduce the out-of-balance current to said predetermined value.

3. In a nuclear reactor having a plurality of coolant passages each provided with an independent circulator, protective equipment comprising in combination a normally unbalanced bridge circuit provided with four arms, a relay having an actuating coil, an armature controlled by said relay and adapted to control apparatus for shutting down the reactor, means for passing the out-of-balance current of said bridge circuit through said actuating coil of said relay so as normally to retain said armature and so as to release said armature to effect the shut down of the reactor when said out-of-balance current has been reduced to a predetermined value, a plurality of resistances connected together at one end in parallel and associated in one-to-one correspondence with said circulators, a plurality of switches each operated by the failure of one circulator and adapted to connect the associated resistance into a first arm of said bridge circuit in such a manner as to reduce the out-of-balance current, each of said switches being operated when the rate of coolant flow in the corresponding coolant passage is reduced below a predetermined value, and means for adjusting the resistance of a second arm of said bridge circuit in order to vary the number of circulators the failure of which will reduce the out-of-balance current to said predetermined value.

4. In a nuclear reactor having a plurality of coolant passages each provided with an independent circulator, protective equipment comprising in combination a normally unbalanced bridge circuit provided with four arms, a relay having an actuating coil, an armature controlled by said relay and adapted to control apparatus for shutting down the reactor, means for passing the out-of-balance current of said bridge circuit through said actuating coil of said relay so as normally to retain said armature and so as to release said armature to effect the shut down of the reactor when said out-of-balance current has been reduced to a predetermined value, a plurality of resistances connected together at one end in parallel and associated in one-to-one correspondence with said circulators, a plurality of switches each operated by the failure of one circulator and adapted to connect the associated resistance into a first arm of said bridge circuit in such a manner as to reduce the out-of-balance current, each of said switches being operated when the direction of coolant flow in the corresponding coolant passage is reversed, and means for adjusting the resistance of a second arm of said bridge circuit in order to vary the number of circulators the failure of which will reduce the out-of-balance current to said predetermined value.

References Cited in the file of this patent

UNITED STATES PATENTS

| | | |
|---|---|---|
| 2,673,960 | Doblmaier | Mar. 30, 1954 |
| 2,781,505 | Grant | Feb. 12, 1957 |
| 2,828,481 | Latapie | Mar. 25, 1958 |

OTHER REFERENCES

Research Reactors (TID–5275), U.S. Government Printing Office (1955), pages 386, 387, 410, 416, 417.

AI–1612 A Report on the Interaction of the Nuclear and Power Plant Controls for the SRE Steam Electric Generating Station, USAEC report dated Apr. 30, 1956, page 6. (Copy in Scientific Library and Div. 46.)

IRE Trans. on Nuclear Science, vol. NS–1, No. 1 (September 1954) pages 4, 5 and 7. (Copy in Scientific Library and 204/193.3.)

NAA–SR–Memo–1639, SRE Instrumentation and Control (by Hall), USAEC report dated May 21, 1956; pages 16–18. (Copy in Scientific Library and 204/193.3.)